United States Patent [19]

Tsukamura

[11] 4,378,566

[45] Mar. 29, 1983

[54] APPARATUS FOR PRODUCING A COLOR PICTURE ON RECORDING PAPER

[75] Inventor: Yoshihiro Tsukamura, Kawasaki, Japan

[73] Assignee: Sony Corporation, Tokyo, Japan

[21] Appl. No.: 201,779

[22] Filed: Oct. 29, 1980

[30] Foreign Application Priority Data

Nov. 2, 1979 [JP] Japan .............................. 54-142253

[51] Int. Cl.$^3$ .............................................. H04N 1/46
[52] U.S. Cl. .................................. 358/75; 346/76 PH
[58] Field of Search ................ 358/75; 346/46, 76 R, 346/76 PH; 360/90, 130.32

[56] References Cited

U.S. PATENT DOCUMENTS

| 3,632,969 | 1/1972 | Walkow | 346/76 PH |
| 4,161,749 | 7/1979 | Erlichman | 358/75 |
| 4,250,511 | 2/1981 | Stein et al. | 346/76 PH |

*Primary Examiner*—Richard Murray
*Attorney, Agent, or Firm*—Lewis H. Eslinger; Alvin Sinderbrand

[57] ABSTRACT

Apparatus for producing a color picture on recording paper in response to a color video signal includes a cylindrical platen having the recording paper circumferentially embraced about at least a portion thereof; a multi-color tape of the thermal transfer type having black, cyan, magenta and yellow colored pigments arranged in lengthwise strips on the tape; a head transfer carriage adapted for movement along the platen in the lengthwise direction thereof; black, cyan, magenta and yellow head groups associated with the black, cyan, magenta and yellow colored pigment strips of the tape and mounted on the head transfer carriage in close proximity to the surface of the platen so that the tape is situated between the head groups and the recording paper, each head group including eight heads for transferring the color of the respective pigment strip with which it is associated to the recording paper; and a control device for controlling movement of the head transfer carriage and head groups in the lengthwise direction of the platen, rotation of the platen, and operation of the heads of each head group for recording respective colors on the recording paper so as to produce the color picture thereon, the control section including a separation circuit for separating cyan, magenta and yellow color signals from the color video signal, color memory circuits for storing one frame of the respective color signals, and a control section for controlling operation of the memory circuits to supply the color signals to the heads.

17 Claims, 5 Drawing Figures

APPARATUS FOR PRODUCING A COLOR PICTURE ON RECORDING PAPER

BACKGROUND OF THE INVENTION

1. Field of the Invention

This invention relates to an apparatus for producing a hard color copy from a color information signal and, more particularly, is directed to an apparatus for producing a color picture on recording paper from a color video signal.

2. Description of the Prior Art

Apparatus for producing a color picture on recording paper in response to a color information signal are known in the art. For example, such apparatus may be included in a terminal unit for an electronic computer and which receives a color information signal from the computer or, which may receive a color video signal from a color video signal broadcast. Such apparatus for producing a hard color copy has conventionally been of the ink jet or electrostatic-print type and, therefore, is of a relatively large size and occupies a considerable amount of space. Further, because of the complexity of such conventional apparatus, it is generally complicated in construction and difficult to service and maintain. It should therefore be appreciated that such known apparatus is not particularly suitable for home, or even office, use.

OBJECTS AND SUMMARY OF THE INVENTION

Accordingly, it is an object of this invention to provide apparatus for producing a hard color copy from a color information signal that avoids the above-described difficulties encountered with the prior art.

More particularly, it is an object of this invention to provide apparatus for producing a hard color copy from a color information signal which is of relatively simple construction and may be constructed in a relatively compact size so as not to occupy an excessive amount of space.

Another object of this invention is to provide apparatus for producing a hard color copy from a color information signal which provides for relatively easy maintenance and service.

Still another object of this invention is to provide apparatus for producing a hard color copy from a color information signal which is inexpensive to manufacture and is suitable for home and office use.

In accordance with an aspect of this invention, apparatus for producing a color picture on recording paper in response to a color information signal includes platen means associated with the recording paper, a tape having a plurality of different colored pigments thereon, a plurality of heads, each associated with a respective one of the pigments for transferring the respective color thereof to the recording paper, and control means for controlling the plurality of heads in response to the color information signal to produce the color picture on the recording paper.

The above, and other, objects, features and advantages of the invention, will be apparent in the following detailed description of illustrative embodiments of the invention which is to be read in connection with the accompanying drawings.

DETAILED DESCRIPTION OF THE PREFERRED EMBODIMENTS

Figure 1A:
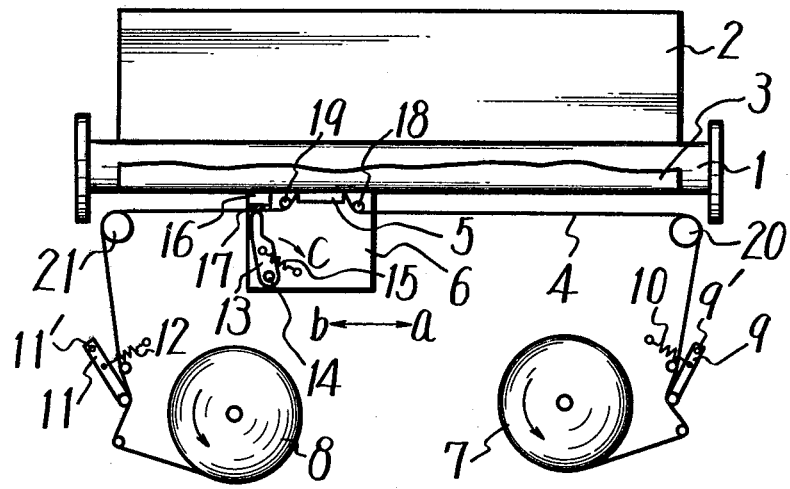
FIG. 1A is a schematic diagram of apparatus for producing a color picture according to one embodiment of this invention.

Referring to the drawings in detail, and initially to FIG. 1A thereof, there is shown an apparatus according to one embodiment of this invention for producing a hard color copy from a color information signal. As shown therein, the apparatus includes a platen 1 having a recording sheet of paper 3 circumferentially embraced thereabout along a portion of its length, with recording sheet 3 preferably being supplied from a continuous paper supply roll 2. A multi-color tape 4, preferably of a thermal transfer type, and a thermal head device 5 are also provided, with multi-color tape 4 being positioned between thermal head device 5 and recording sheet 3 for producing a color picture on recording sheet 3 in response to a color information signal. It is to be noted that the color picture may consist of any combination of words, symbols, characters, patterns, or the like.

Figure 2A:
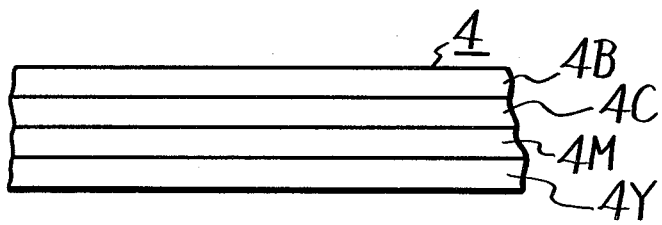
FIG. 2A is a top plan view of one embodiment of a multi-color tape of the heat transfer type which may be used with this invention.
Figure 2B:
FIG. 2B is a cross-sectional view of the multi-color tape of FIG. 2A.

Referring now to FIGS. 2A and 2B, one embodiment of a multi-color tape 4 of the thermal transfer type which may be used with the apparatus of FIG. 1A is shown to include a base tape 4a, for example, of polyester with a width of 12 mm and a thickness of 12 $\mu$m, and a binder layer 4d, for example, a paraffin with a thickness of 5 $\mu$m and a width also of 12 mm. Black, cyan, magenta and yellow color thermal sensitive pigment layers 4B, 4C, 4M and 4Y are each provided along respective longitudinal strips of tape 4 and have a width of, for example, 3 mm. In forming the tape, heat is supplied to base tape 4a for a short period of time so as to slightly melt binder 4d. This results in the outer surface of tape 4 and, more particularly, pigment layers 4B, 4C, 4M and 4Y thereon, being coated by the paraffin from binder layer 4d to prevent any of the printing ink from the pigment layers being transferred to, for example, the fingers of the operator.

Figure 3:
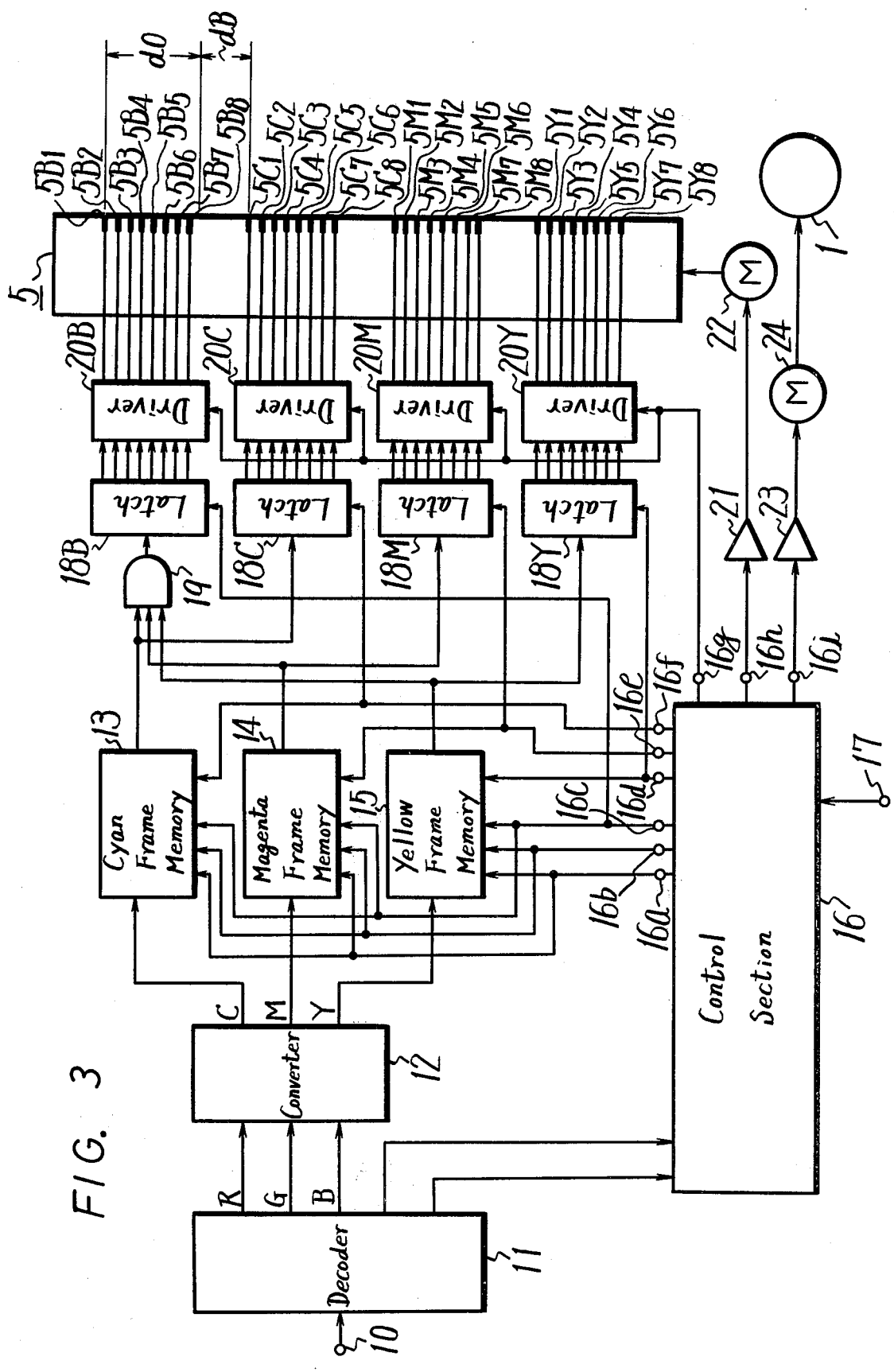
FIG. 3 is a block diagram of one embodiment of a control device that may be used with this invention for controlling movement and operation of the plurality of heads with respect to the recording paper.

Thermal head device 5 includes four heating head groups 5B, 5C, 5M and 5Y, each consisting of eight heating heads or transducers $5B_1, 5B_2, \ldots 5B_8$; $5C_1, 5C_2, \ldots 5C_8$; $5M_1, 5M_2, \ldots 5M_8$; and $5Y_1, 5Y_2, \ldots 5Y_8$, respectively, which correspond to black, cyan, magenta and yellow color pigment layers 4B, 4C, 4M and 4Y, respectively, as shown in FIG. 3. The heating heads within each group are equally separated from each other and the eight heads of each group occupy a width $d_0$ which is smaller than the width of the respective pigment layers of tape 4. For example, if the width of each pigment layer is 3 mm, then the width occupied by the eight heads of each group can be chosen as 2 mm, in which each group of eight heads is centered with respect to a respective one of the pigment layers. Thus, adjacent heating head groups are separated by a distance $d_B$ of 1 mm. It should therefore be appreciated that minor positional deviation or error between the color pigment layers of tape 4 and the heating head groups of thermal head device 5 does not result in color misregistration of the color picture recorded on recording paper 3.

Each of the heating heads is preferably made of a resistive material which is heated when an electrical signal is supplied thereto. Thus, the heating of each heating head results in the paraffin of binder layer 4d, which is located between the respective heated head and recording paper 3 and is in contact with recording paper 3, being melted so as to supply the respective color pigment to recording paper 3.

Returning back to FIG. 1A, the apparatus according to this invention further includes a head transfer carriage or base 6 which is adapted to move in the lengthwise or X-axis direction of platen 1, as shown by arrows a and b. Thermal head device 5 is fixed on head transfer carriage 6 in close proximity to platen 1 and is adapted to move with head transfer carriage 6 in the lengthwise direction of platen 1. As shown in FIG. 1A, multi-color tape 4 is wound about a supply reel 7 and a take-up reel 8 and extends between such reels in the lengthwise direction of platen 1 between fixed guide rollers 20 and 21 located at opposite ends of platen 1. In addition, the tape extending between such guide rollers 20 and 21 is further located between thermal head device 5 and recording sheet 3 between a pair of guide rollers 18 and 19 which are mounted on head transfer carriage 6 on opposite sides of thermal head device 5. A tape press or hold device is also provided on head transfer carriage 6 and includes a tape press lever 13 rotatable about a pin 14 at one end thereof and biased in the clockwise direction of FIG. 1A, as indicated by arrow c, by means of a spring 15 secured at one end to heat transfer carriage 6 and at the other end to tape press lever 13. The tape press device further includes a tape receiving member 16 fixedly mounted on head transfer carriage 6 in close proximity to the free end of tape press lever 13 and has a rubber plate 17 secured to the side thereof facing tape press lever 13. It should therefore be appreciated that tape press lever 13 is normally biased into engagement with rubber plate 17 of tape receiving member 16 by means of spring 15 so as to grip tape 4. However, movement of multi-color tape 4 in the direction from supply reel 7 to take-up reel 8, that is, in the right-to-left direction of FIG. 1A, overcomes the force of spring 15 so that multi-color tape 4 is free to move between tape press lever 13 and rubber plate 17. Thus, when head transfer carriage 6 moves in the direction of arrow a, supply reel 7 does not supply any multi-color tape 4 so that tape 4 is free to move between tape press lever 13 and rubber plate 17, resulting in different unused portions of tape 4 being disposed between thermal head device 5 and recording sheet 3. At this time, take-up reel 8 is also inoperative. It should also be appreciated that during such movement, the positional arrangement of guide roller 19, rubber plate 17 and tape press lever 13 away from platen 1 results in the removal of peeling off of the used portions of tape 4 from recording sheet 3. In other words, tape 4 does not stick to recording sheet 3 after the pigment colors therefrom are transferred to recording sheet 3. In comparison to such operation, when heat transfer carriage 6 moves in the direction of arrow b, tape press lever 13 clamps tape 4 to rubber plate 17 to prevent movement therebetween. In order to prevent tape 4 from breaking during such movement, supply reel 7 supplies multi-color tape 4 to the apparatus. Also, at such time, take-up reel 8 is activated to take up slack in the used tape caused by such movement of head transfer carriage 6.

The apparatus according to the embodiment of FIG. 1A also includes a supply tension regulating device disposed between guide roller 20 and supply reel 7 for taking up any slack in multi-color tape 4 located between thermal head device 5 and supply reel 7. The supply tension regulating device includes a tension regulating lever 9 pivoted at one end about a pivot pin 9' and having its free end biased into engagement with the tape extending between guide roller 20 and supply reel 7 by means of a tension spring 10. Thus, when head transfer carriage 6 moves in the direction of arrow a, tension regulating lever 9 takes up any slack in the tape that may result from, for example, extension of tape 4 caused by heat applied thereto from the heating heads of thermal head device 5. A take-up tension regulating device is, in like manner, provided between guide roller 21 and take-up reel 8 for taking up any slack in tape 4 located between thermal head device 5 and take-up reel 8. In particular, the take-up tension regulating device includes a tension regulating lever 11 pivoted at one end about a pivot pin 11' and having its free end biased into engagement with the tape extending between guide roller 21 and take-up reel 8 by means of a tension spring 12. The take-up tension regulating device takes up any excess slack in tape 4 which extends between take-up reel 8 and the free end of tape press lever 13 and which is not wound about take-up reel 8 when head transfer carriage 6 moves in the direction of arrow b of FIG. 1A.

Figure 1B:
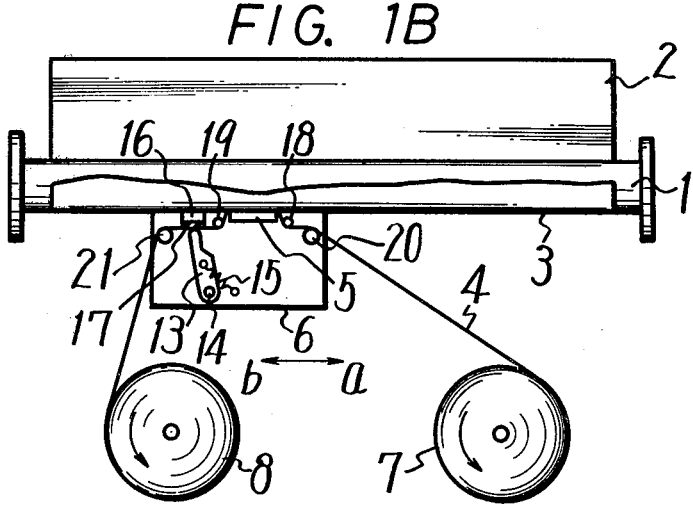
FIG. 1B is a schematic diagram of apparatus for producing a color picture according to another embodiment of this invention.

Referring now to FIG. 1B, apparatus according to another embodiment of this invention for producing a hard color copy will now be described, with elements corresponding to those described with reference to the embodiment of FIG. 1A being identified by the same reference numerals. The apparatus of FIG. 1B is identical to that of FIG. 1A with the exception that the supply and take-up tension regulating devices are eliminated and guide rollers 20 and 21 are fixed at opposite ends of head transfer carriage 6. Thus, when head transfer carriage 6 is moved in the direction of arrow a in FIG. 1B, supply reel 7 and take-up reel 8 are activated to maintain tape 4 with a predetermined tension therebetween. In other words, supply reel 7 and take-up reel 8 perform the function of the supply and take-up tension regulating devices of FIG. 1A. When head transfer carriage 6 moves in the direction of arrow b, supply reel 7 supplies a necessary amount of tape 4 and take-up reel 8 takes up any excess tape, in the same manner as the apparatus of FIG. 1A.

A control device for controlling movement of head transfer carriage 6, thermal head device 5, and platen 1 will now be discussed in regard to FIG. 3. As shown therein, a color information signal, such as a color video signal, is supplied to an input terminal 10 which, in turn, supplies the color video signal to a decoder circuit 11 which separates the color video signal into a red color signal R, a green color signal G, a blue color signal B, and horizontal and vertical synchronizing signals $S_H$ and $S_V$. The red, green and blue color signals R, G and B are then supplied to a converter circuit 12 which produces a cyan color signal C, a magenta color signal M and a yellow color signal Y from the primary color signals R, G and B. In particular, cyan color signal C is formed from the combination of the green and blue color signals G and B, the magenta color signal M is formed from the combination of the blue and red color signals B and R, and the yellow color signal Y is formed from the combination of the red and green color signals R and G. A cyan memory circuit 13 receives the cyan color signal C from converter circuit 12 and stores one frame of such signal therein. In like manner, a magenta memory circuit 14 receives the magenta color signal M from converter circuit 12 and stores one frame of such signal therein, and a yellow memory circuit 15 receives the yellow color signal Y from converter circuit 12 and stores one frame of such signal therein. The horizontal and vertical synchronizing signals $S_H$ and $S_V$ from decoder circuit 11 are supplied to a control section 16 of the control device which is used for controlling the operation of cyan, magenta and yellow memory circuits 13, 14 and 15. Control section 16 preferably includes a clock generator, a timing generator, an X-axis counter for determining the position of thermal head device 5 in the horizontal or lengthwise direction of platen 1, a Y-axis counter for determining the vertical position of thermal head device 5, and other circuitry. Control section 16 produces a WRITE signal at an output terminal 16a and a WRITE ADDRESS signal at an output terminal 16b, both of which are supplied to cyan, magenta and yellow memory circuits 13, 14 and 15 for controlling the writing of each frame of cyan, magenta and yellow color signals from converter circuit 12 into memory circuits 13, 14 and 15 at predetermined addresses thereof. Further, control section 16 receives a COPY START signal at an input terminal 17 thereof which initiates the writing operation so that a WRITE signal and WRITE ADDRESS signal are supplied to cyan, magenta and yellow memory circuits 13, 14 and 15, wherein such circuits store one frame of the respective color components of a color video signal.

The output signals from cyan, magenta and yellow memory circuits 13, 14 and 15 are supplied to latch circuits 18C, 18M and 18Y, respectively, each of which has a memory storage capacity for storing eight picture elements aligned in the vertical direction. In particular, latch circuit 18C is adapted to store eight vertically aligned cyan color picture elements for a given horizontal or X-axis position along platen 1. In like manner, latch circuit 18M is adapted to store eight magenta picture elements aligned in the vertical direction for the same horizontal position along platen 1, and latch circuit 18Y is adapted to store eight yellow picture elements aligned in the vertical direction and corresponding to the same horizontal position along platen 1. The output signals from cyan, magenta and yellow memory circuits 13, 14 and 15 are also supplied to an AND circuit 19 which supplies an output signal to another latch circuit 18B which is used to control the black head group 5B. As with the other latch circuits, latch circuit 18B has a memory storage capacity for eight black picture elements aligned in the vertical direction for the same horizontal position on platen 1.

Control section 16 also produces READ ADDRESS signals which are supplied to memory circuits 13, 14 and 15 for controlling which portion of the signals are to be read out therefrom. In particular, control section 16 produces a CYAN READ ADDRESS signal at an output terminal 16f thereof which is supplied to cyan memory circuit 13. In response thereto, cyan memory circuit 13 reads out signals corresponding to eight picture elements between vertical points or lines $Y_n$ and $Y_{n+12}$ on the Y-axis of platen 1 and corresponding to a fixed horizontal position $X_m$ on the X-axis thereof. For example, for the first line $X_0$ in the horizontal or X-axis direction, eight picture elements situated between vertical lines $Y_0$ and $Y_{12}$ are read out and supplied to AND circuit 19 and latch circuit 18C. It should be appreciated that the reason that only eight picture elements in the vertical or Y-axis direction are read from cyan memory circuit 13 is because only eight heads $5C_1-5C_8$ are provided in cyan head group 5C, with the eight heads being centered within the strip of cyan color pigment 4C on tape 4. For example, assume that the width of cyan color pigment strip 4C is 3 mm and that the eight cyan heads $5C_1-5C_8$ occupy a width $d_0$ on such strip of 2 mm with safety strips on both sides thereof that are not occupied by the heads and which has a combined width $d_B$ of 1 mm. Since the width $d_B$ is one-half the width $d_0$, the width $d_B$ corresponds to four picture elements so that a width of 12 picture elements must be provided within which the eight picture elements are located in order to assure that heads $5C_1-5C_8$ receive the appropriate signals. In like manner, magenta memory circuit 14 receives a MAGENTA READ ADDRESS signal from an output terminal 16e of control section 16 and, in response thereto, reads out signals corresponding to eight picture elements situated between vertical points or lines $Y_{n+13}$ and $Y_{n+24}$ at the same horizontal or X-axis location $X_m$. For example, signals corresponding to eight magenta picture elements may be read out from magenta memory circuit 14 which are situated between vertical lines $Y_{13}$ and $Y_{24}$ for the first horizontal line $X_0$. The signals from magenta memory circuit 14 are supplied to latch circuit 18M and AND circuit 19. Also, yellow memory circuit 15 receives a YELLOW READ ADDRESS signal from an output terminal 16d of control section 16 and, in response thereto, reads out signals corresponding to eight yellow picture elements situated between vertical lines $Y_{n+25}$ and $Y_{n+36}$. For example, and in accordance with the previous examples for cyan and magenta memory circuits 13 and 14, yellow memory circuit 15 reads out signals corresponding to eight yellow picture elements situated between lines $Y_{25}$ and $Y_{36}$ at the same horizontal location $X_0$ on platen 1. Such signals from yellow memory circuit 15 are supplied to latch circuit 18Y and AND circuit 19. In like manner, a BLACK READ ADDRESS signal is supplied from an output terminal 16c of control section 16 to each of cyan, magenta and yellow memory circuits 13, 14 and 15, wherein each of the memory circuits reads out signals corresponding to eight picture elements between vertical lines $Y_{n-12}$ and $Y_{n-1}$. Such signals are supplied to AND circuit 19. It should therefore be appreciated that AND gate 19 provides a black control signal to latch circuit 18B only when cyan, magenta and yellow color signals are all present at a particular vertical point.

Each of latch circuits 18B, 18C, 18M and 18Y has eight output terminals corresponding to the eight picture elements supplied thereto. Further, latch circuits 18B, 18C, 18M and 18Y are supplied with the READ ADDRESS signals from output terminals 16c, 16d, 16e and 16f, respectively for controlling the reading operation from such latch circuits. Signals corresponding to picture elements from latch circuit 18B are supplied to a driver circuit 20B which, in turn, is connected to black heating heads $5B_1-5B_8$ for controlling the operation thereof. In like manner, eight output terminals from latch circuit 18C are connected to drive circuit 20C which, in turn, is connected to cyan heating heads $5C_1$–$5C_8$ for controlling the operation thereof. Also, the eight output terminals from latch circuits 18M and 18Y are connected to driver circuits 20M and 20Y, respectively, which, in turn, are connected to magenta heating heads $5M_1$–$5M_8$ and yellow heating heads $5Y_1$–$5Y_8$, respectively, for controlling the respective operations thereof.

Control section 16 also produces a head transfer signal at an output terminal 16h thereof which is supplied through a drive circuit 21 to a drive motor 22 which moves head transfer carriage 6 in the longitudinal or X-axis direction along platen 1. For example, drive motor 22 may be a step motor which moves head transfer carriage 6 in the X-axis direction of platen 1 by one picture element after a predetermined amount of time, for example, 5 ms. Thus, when head transfer carriage 6 and thermal head device 5 which is fixed thereon are moved to a horizontal or X-axis position along platen 1, control section 16 produces a print control signal at an output terminal 16g thereof which is supplied to driver circuits 20B, 20C, 20M and 20Y as a gate signal therefor so that the output signals from such driver circuits are supplied to heating heads $5B_1$–$5B_8$, $5C_1$–$5C_8$, $5M_1$–$5M_8$ and $5Y_1$–$5Y_8$, respectively. It should be appreciated that the signals from driver circuits 20B, 20C, 20M and 20Y are supplied to the respective heating heads for a predetermined amount of time which is less than the time in which drive motor 22 moves head transfer carriage 6 in the horizontal direction. For example, if head transfer carriage 6 is moved in the horizontal or X-axis direction by one picture element every 5 ms, the output signals from drive circuits 20B, 20C, 20M and 20Y are supplied to their respective heating heads in a smaller amount of time, for example, 2.5 ms, to assure accurate operation.

In addition, a paper feed control signal is produced by control section 16 at an output terminal 16i thereof and supplied through a drive circit 23 to a motor 24 which rotates platen 1 so as to control the vertical position of the printing on recording paper 3 located on platen 1. For example, after head transfer carriage 6 and thermal head device 5 complete one horizontal line along platen 1, and are returned to the left-most position of platen 1 in FIG. 1A, motor 24, in response to the signal produced at output terminal 16i of control section 16 rotates platen 1 by, for example, 2 mm which corresponds to the area covered by each of the head groups 5B, 5C, 5M and 5Y. The above operation is continually repeated until the entire frame of the color video signal is read from memory circuits 13, 14 and 15 so that a color picture corresponding to the color video signal supplied to input terminal 10 is recorded on recording sheet 3 to obtain a hard color copy of a desired character, pattern, or the like.

It should therefore be appreciated that the present invention is of relatively simple construction and of a compact size. Further, since the transfer of color from the respective pigment layers to recording sheet 3 is accomplished by a thermal transfer operation, conventional paper can be utilized as the recording paper. It should be further appreciated that, because of the relative simplicity of the apparatus, maintenance of the apparatus is relatively easy and inexpensive and can thus be easily employed in home or office use. For example, when tape 4 is completely used, it is a simple operation to substitute a new multi-color tape 4 for the used multi-color tape 4. The present invention also has the advantage of providing a separate black color strip 4B on tape 4 which is separate from the cyan, magenta and yellow color strips 4C, 4M and 4Y, and it is therefore unnecessary to transfer all of the cyan, magenta and yellow colors to the recording sheet in order to provide a black color.

It is to be appreciated, however, that various modifications may be made within the scope of this invention. For example, although cyan, magenta and yellow colors have been illustrated, other colors such as blue, green and red may be utilized in place thereof. It is also possible to provide additional colors, in addition to the cyan, magenta and yellow colors, by combining such latter colors in the recording operation. In addition, although multi-color tape 4 is fed from supply reel 7 in the embodiments of FIGS. 1A and 1B, multi-color tape 4 may be of the endless type. With such modification, the endless tape could be gripped by a roller, for example, in the shape of a cylindrical post having a multi-colored coating on its outer surface corresponding to the coating on the endless thermal transfer multi-colored tape 4, and a heating roller associated with such roller which is heated at, for example, 70°–100° C., in order to continually replenish the colors on the endless tape.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for producing color visual information on recording paper in response to a color information signal, comprising:
    platen means associated with said recording paper;
    a tape having a plurality of different colored pigments thereon, each existing in only one of a plurality of separate color tracks extending in the lengthwise direction of said tape;
    a plurality of recording heads, each adapted for movement in the lengthwise direction of said platen means along a length thereof determined by the color visual information to be printed so that each head prints only one line of said color visual information on the recording paper during each movement of said respective head in said lengthwise direction for said determined length, each recording head being associated with a respective one of said separate color tracks for transferring the respective color thereof to said recording paper; and
    control means for controlling said plurality of heads in response to said color information signal to produce said color visual information on said recording paper.

2. Apparatus according to claim 1; in which said control means includes separation means for separating color signals corresponding to the different colors of said pigments from said color information signal, memory means for storing said color signals, and a control section for controlling the operation of said memory means to supply said color signals to said plurality of heads for transferring the respective colors of said pigments associated with said plurality of heads to said recording paper.

3. Apparatus according to claim 2; in which said memory means includes a plurality of memory devices, each adapted to store a respective one of said color signals, and said control section supplies WRITE and READ control signals to said plurality of memory devices for controlling the writing and reading of said color signals into and from said plurality of memory devices.

4. Apparatus according to claim 3; in which said control section further includes a plurality of latch means, each adapted to receive color signals read out from a respective one of said memory devices, and a plurality of driver means, each associated with respective ones of said plurality of heads for controlling the recording operation of said respective ones of said plurality of heads in response to a respective one of said latch means.

5. Apparatus according to claim 4; in which one of the colors of the pigments on said tape is black and in which said control section further includes gate means receiving signals from each of said memory devices and for producing an output signal when each of the signals from said plurality of memory devices satisfies a predetermined condition, black level latch means receiving said output signal from said gate means, and black level driver means for controlling the recording operation of those heads associated with said black colored pigment on said tape in response to said black level latch means.

6. Apparatus according to claim 5; in which said control section supplies said READ control signals to said black level latch means and said plurality of latch means and supplies a print control signal to said black level driver means and said plurality of driver means so as to control the timing of the recording operation by said plurality of heads.

7. Apparatus according to claim 6; in which said color information signal is a color video signal having horizontal and vertical synchronizing signals; said separation means separates said color signals and said horizontal and vertical synchronizing signals from said color video signal; each of said memory devices stores one frame of the respective color signal supplied thereto; and said control section controls the operation of said plurality of memory devices, said plurality of latch means and said plurality of driver means in response to said horizontal and vertical synchronizing signals.

8. Apparatus according to claim 7; in which said separation means includes decoder means for separating red, green and blue primary color signals and said horizontal and vertical synchronizing signals from said color video signal, and converter means for producing cyan, magenta and yellow color signals from said red, green and blue primary color signals.

9. Apparatus according to claim 1; in which said platen means includes a cylindrical platen and said apparatus further includes carriage means having said plurality of heads secured thereon in close proximity to the cylindrical surface of said platen, said carriage means being adapted to move in the lengthwise direction of said platen.

10. Apparatus according to claim 9; further including motor means for moving said carriage means in the lengthwise direction of said platen, and said control means controls the operation of said motor means to move said carriage means in said lengthwise direction.

11. Apparatus according to claim 9; in which said tape is positioned between said plurality of heads and said recording paper with said different colored pigments thereon facing toward said recording paper.

12. Apparatus according to claim 1; in which said platen means includes a cylindrical platen having a central axis, said apparatus further includes motor means for rotating said platen about its central axis, and said control means controls the operation of said motor means to rotate said platen about its central axis.

13. Apparatus according to claim 1; in which said tape is a multi-color tape of the thermal transfer type and includes a base tape, a binder layer on said base tape and a plurality of different colored pigments arranged in lengthwise strips on said binder layer.

14. Apparatus according to claim 1; further including a supply reel and a take-up reel between which said tape extends, and tensioning means for maintaining said tape in a tensioned condition between said supply reel and said take-up reel in close proximity to said platen means.

15. Apparatus according to claim 14; in which said tensioning means includes first and second tension regulating levers positioned adjacent said tape extending between said plurality of heads and said supply and take-up reels, respectively, said first and second tension regulating levers each having a first end pivotally mounted to a frame and a second free end normally biased into engagement with said tape for removing any slack therefrom.

16. Apparatus according to claim 1; further including carriage means having said plurality of heads secured thereon in close proximity to said platen means, and tape press means for permitting movement of said tape between said plurality of heads and said recording paper in only one direction.

17. Apparatus according to claim 16; in which said tape press means includes a tape receiving member fixedly secured on said carriage means and a tape press lever having one end pivotally mounted on said carriage means and a second free end normally biased into engagement with said tape receiving member to grip the tape therebetween.

* * * * *